Feb. 19, 1924.
J. P. HEIL
1,484,327
DUMPING BODY FOR VEHICLES
Filed Nov. 7, 1921
3 Sheets-Sheet 1
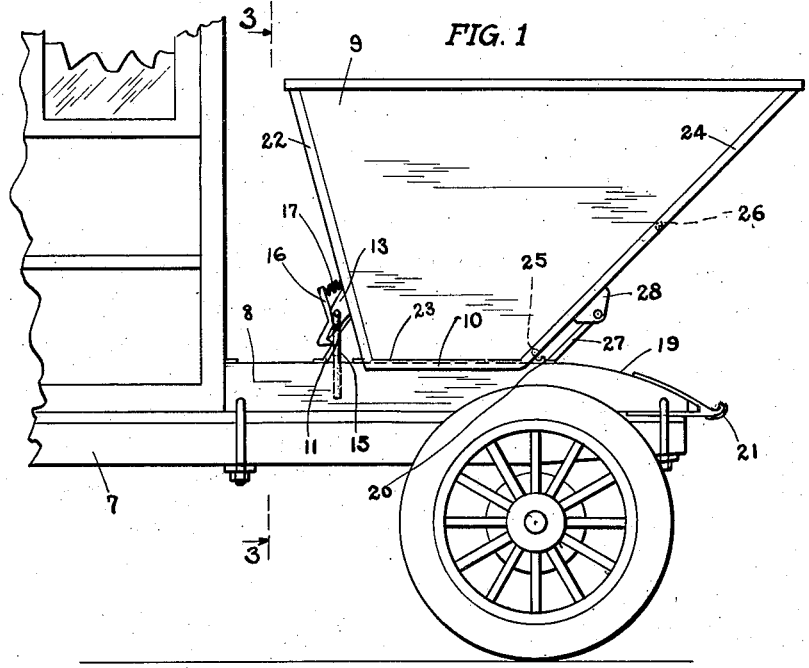
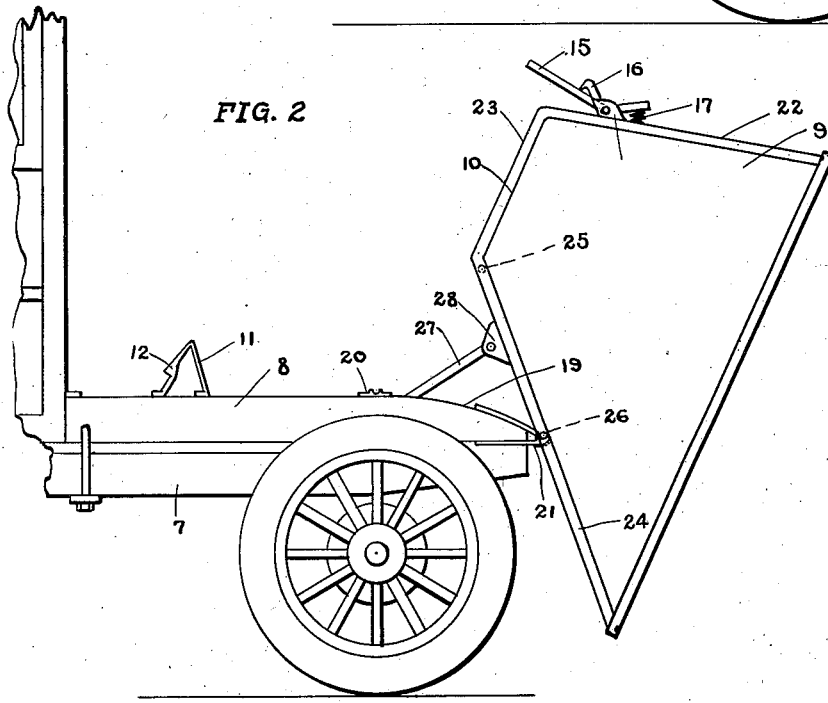
INVENTOR.
Julius P. Heil.
BY Morsell + Keeney.
ATTORNEYS.

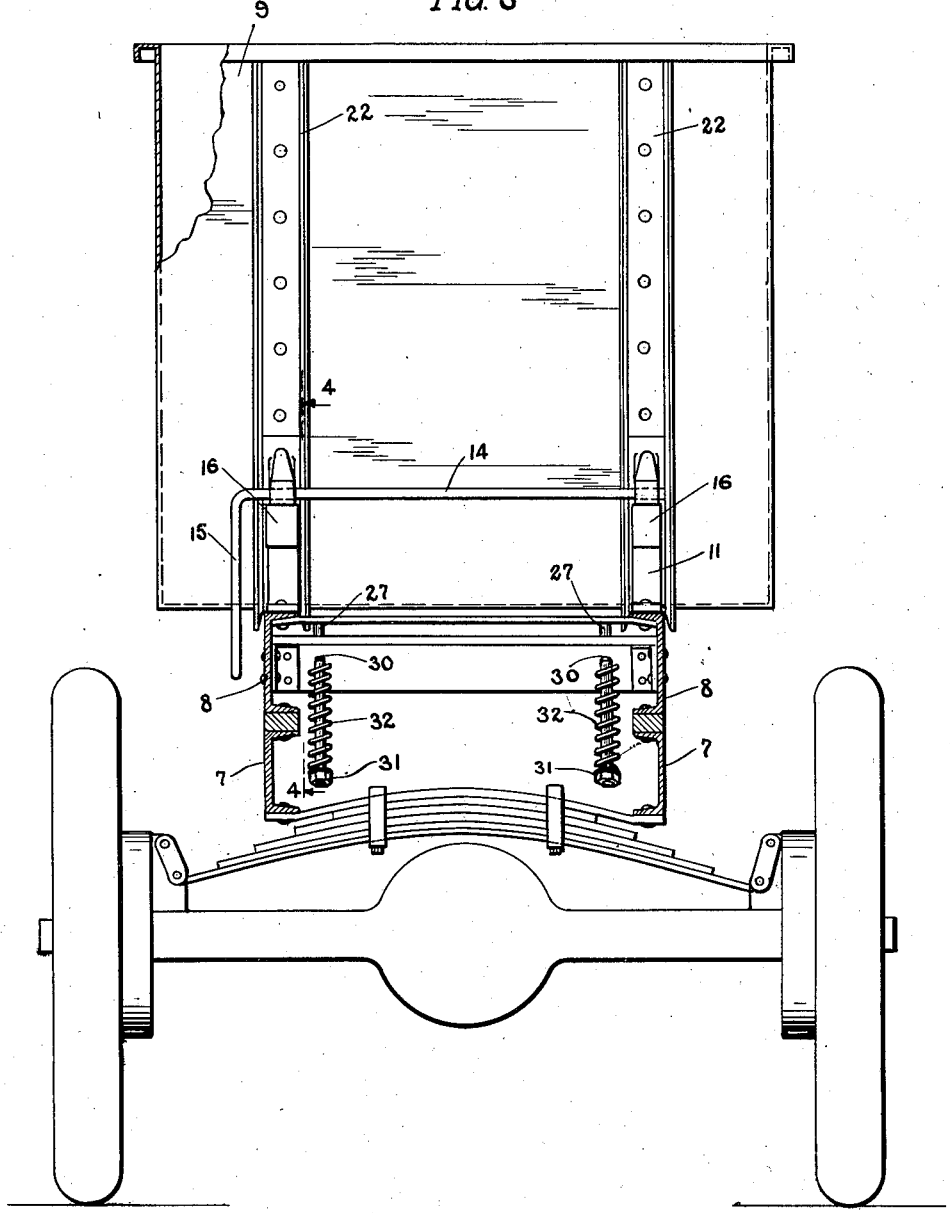

Feb. 19, 1924.
J. P. HEIL
DUMPING BODY FOR VEHICLES
Filed Nov. 7, 1921
1,484,327
3 Sheets-Sheet 3

INVENTOR.
Julius P. Heil.
BY Morsell + Keeney.
ATTORNEYS.

Patented Feb. 19, 1924.

1,484,327

UNITED STATES PATENT OFFICE.

JULIUS P. HEIL, OF MILWAUKEE, WISCONSIN, ASSIGNOR TO THE HEIL CO., OF MILWAUKEE, WISCONSIN, A CORPORATION OF WISCONSIN.

DUMPING BODY FOR VEHICLES.

Application filed November 7, 1921. Serial No. 513,542.

*To all whom it may concern:*

Be it known that I, JULIUS P. HEIL, a citizen of the United States, and resident of Milwaukee, in the county of Milwaukee and State of Wisconsin, have invented new and useful Improvements in Dumping Bodies for Vehicles, of which the following is a description, reference being had to the accompanying drawings, which are a part of this specification.

This invention relates to improvements in dumping bodies for vehicles and more particularly to a dumping body normally positioned on the frame of the vehicle in load retaining position but capable of moving relative thereto in load discharging position; and one of the objects of the invention is to provide novel means for limiting rearward movement of the body relative to the frame.

A futher object of the invention is to provide means adapted to limit rearward movement of the body relative to the frame which means is capable of cushioning the shock that occurs when the body reaches its load discharging position and which is also capable of aiding in tilting the body from its normal position and in returning the body to its normal or load retaining position.
The invention contemplates the provision of a dump body of such shape that it may be readily tilted to the rear with respect to the vehicle; and a further object of the invention is to provide novel means of simple construction for retaining the body in its normal or load retaining position whereby upon release of said means, the body may easily be moved into its load discharging position.
The invention also contemplates the provision of bearing means provided on the frame of the vehicle which is engaged by suitable bearing means carried by the body of the vehicle when the body is in its load discharging position; and a further object of the invention is to provide bearing means on the frame of the vehicle which is adapted to be engaged by suitable means carried by the body of the vehicle the moment the body begins to move out of its normal position, whereby the body is supported while moving from its normal into its load discharging position.

The invention consists in the novel constructions, arrangements and devices to be hereinafter described and claimed for carrying out the above stated objects and such other objects as will appear from the following description of a certain preferred embodiment illustrated in the accompanying drawings, wherein—

Fig. 1 is a side elevational view of a fragmentary portion of a vehicle equipped with a dump body and embodying the principles of the invention, the dump body being shown in its normal or load retaining position;

Fig. 2 is a side elevational view similar to Fig. 1 but showing the body in its dumping or load discharging position;

Fig. 3 is a sectional view, on an enlarged scale, taken on the line 3—3 of Fig. 1;

Figure 4:
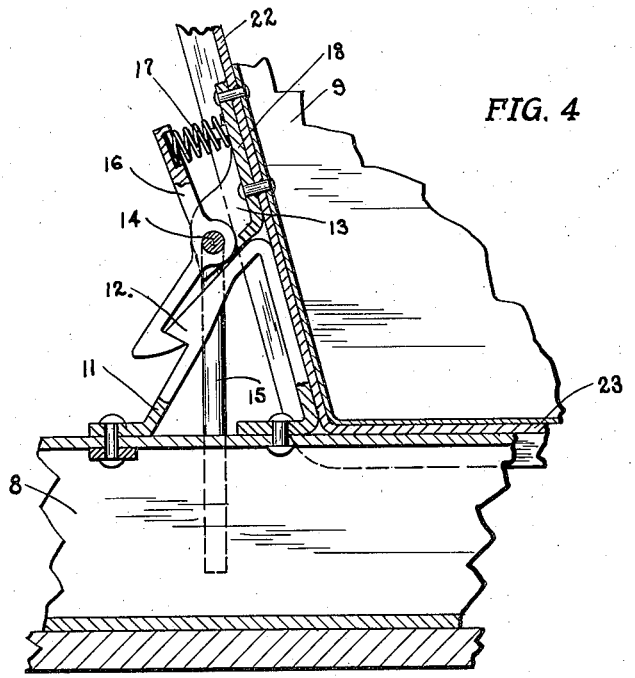
Fig. 4 is a view, on a still larger scale, taken on the line 4—4 of Fig. 3.
Figure 5:
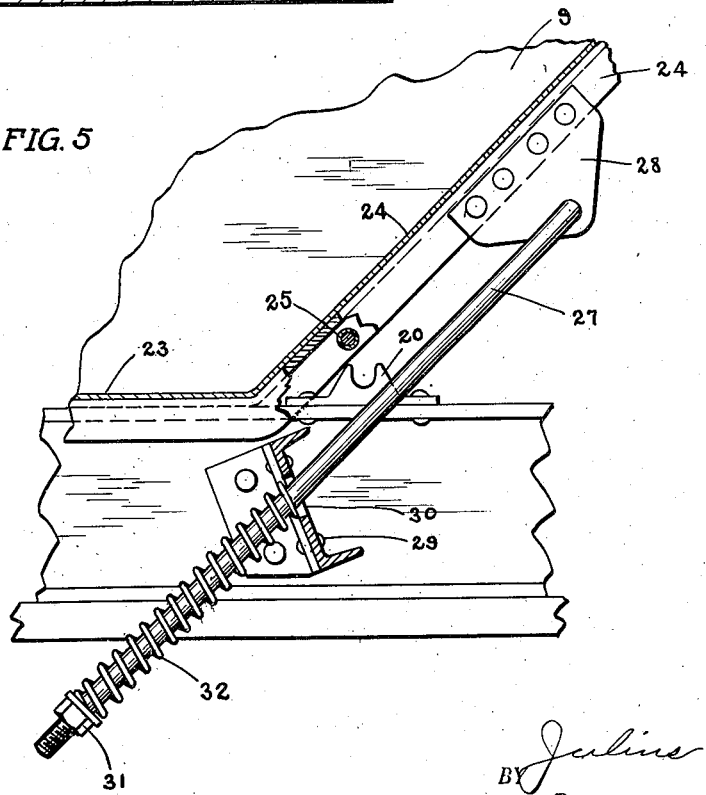
Fig. 5 is a detail view showing the means preferably employed for limiting movement of the body relative to the frame.

Referring now to the drawings, it will be seen that the chassis of the vehicle includes a pair of longitudinally extending channel members 7 to the upper horizontal flanges of which are secured channel members 8, respectively, and on which the bottom 10 of the dump body 9 rests when the latter is in its normal or load retaining position, as shown in Fig. 1.

The center of gravity of the dump body is such that it may readily be tilted to the rear of the vehicle and means is provided, therefore, to hold the body in its normal position, which means preferably includes bracket members 11, see Fig. 4, secured to the upper horizontal flanges of the respective channel members 8, each of which is provided with a tooth 12. On the front side of the body and secured thereto in any desired manner is a pair of bracket members 13 in which is journaled a transversely extending rod 14 provided with an operating handle 15 at each end. Rigidly secured to the rod 14 are catch members 16 which are adapted to engage the respective teeth formed on the bracket members 11. The handle 15 of the rod 14 normally hangs pendant and maintains the latch members 16 in operative engagement with the catch members 11. If desired, compression springs 17 may be interposed between the body and the upper ends of the latch members 16 to insure the latch members being maintained in operative engagement with the catch members at all normal times. Plates 18 are preferably secured to the front side of the body, the lower ends of said plates being bent, as shown in Fig. 4, to bear on the brackets 11 when the body is in its normal position.

The members 8 at their rear ends are rounded off as at 19 and each member has secured thereto a bearing block 20 and a bearing bracket 21. The body is reinforced by securing channel irons 22, 23 and 24 to its front, bottom and rear sides, respectively, which channel members are in line with the frame members 8. These channel members are positioned with their backs against the dump body so that the flanges of the channel members 23 effectively prevent lateral movement of the body, when in its normal position, relative to the frame. Bearing pins 25 and 26 are journaled in the respective channel members 24, these pins being so arranged that the pins 25 co-engage with the bearing blocks 20 immediately the dump body begins to move from its normal position into its load discharging position, and when in its latter position, the pins 26 co-engage with the bearing brackets 21 and support the body. The bearing pins 25 serve to support the body and guide it while it is swinging from its normal into its load discharging position, and vice versa.

The means to limit rearward movement of the body relative to the frame, when the body is swinging into its load discharging position, preferably includes a pair of rods 27 pivotally connected at their upper ends to plates 28 riveted to the respective channel members 24, the lower ends of said rods projecting through apertures 30 provided in a transversely extending member 29 secured to the frame members 8. A stop member, preferably in the form of a nut 31, is provided on the lower end of each of the rods 27 and a relatively heavy compression spring 32 encircles the lower portion of each of the rods 27, said spring being interposed between the nut 31 and the cross member 29.

The operation of the dumping body will be apparent from the foregoing description, but may be summarized briefly as follows:—Assuming the body is loaded and is in the position shown in Fig. 1, it will be obvious upon releasing the latch members 16 from engagement with the respective catch members 11, that the body may be easily swung into its load discharging position, the bearing pins 25 first coming into engagement with the bearing blocks 20 and pivotally supporting the body until the bearing pins 26 come into engagement with the bearing brackets 21. Upon the bearing pins 26 coming into engagement with bearing brackets 21, the body continues to turn over rearwardly, its rearward movement being checked by the rods 27 and the compression springs associated with said rods. The compression springs absorb the shock which occurs when the bearing pins 26 strike the bearing brackets 21 and upon the load being discharged from the body, said springs act to aid in returning the body to its normal or load retaining position. As the body swings back into its normal position, the latch members 16 automatically swing into operative engagement with the catch members 11. The body being designed so that it may easily be swung from its normal position into its load discharging position, it requires very little effort on the part of the operator to dump the body once the latch members have been released from the catch members. By providing compression springs of suitable strength, the body may be returned to its normal position with very little effort on the part of the operator. The rods 27 and the compression springs preferably are so designed that they not only cushion the shock and aid in returning the body to its normal position as described, but they also aid in tilting the body when it is in its normal position, the springs being under some compression when the body is in its normal position.

I claim:

1. The combination with the frame of a vehicle, of a body normally positioned on the frame in load retaining position but capable of moving relative thereto into load discharging position, a rod slidably engaging a portion of the frame and pivotally connected at one end to said body, a stop on said rod, and a spring encircling said rod and interposed between said stop and said portion of the frame, for the purpose specified.

2. The combination with the frame of a vehicle having two spaced bearing members, of a body normally positioned on the frame in load retaining position but capable of moving relative thereto into load discharging position, a bearing member carried by said body and adapted to co-engage with one of said first mentioned bearing members when the body is in load discharging position, a second bearing member carried by said body and adapted to co-engage with the other of said first mentioned bearing members to support the body while moving into load discharging position, a rod slidably engaging a portion of the frame and pivotally connected at one end to said body, a stop on said rod, and a spring encircling said rod and interposed between said stop and said portion of the frame, said rod and said spring being adapted to exert a pull on the body to move it out of its normal position, to cushion the shock when the body swings into its load discharging position and to aid in pulling the body from said last mentioned position back to its normal position.

In testimony whereof, I affix my signature.

JULIUS P. HEIL.